United States Patent

Sink

[11] Patent Number: 5,549,395
[45] Date of Patent: Aug. 27, 1996

[54] SHAFT JOURNAL BEARING HAVING IMPROVED SEAL WEAR RING

[75] Inventor: Danny R. Sink, Chester, Va.

[73] Assignee: Brenco, Incorporated, Petersburg, Va.

[21] Appl. No.: 471,501

[22] Filed: Jun. 6, 1995

[51] Int. Cl.⁶ ........................................... F16C 33/78
[52] U.S. Cl. .......................... 384/477; 384/484; 384/582
[58] Field of Search ...................... 384/477, 486, 384/484, 485, 582, 581

[56] References Cited

U.S. PATENT DOCUMENTS

| | | |
|---|---|---|
| 3,494,682 | 2/1970 | Keller . |
| 4,820,062 | 4/1989 | Shirane ............................ 384/486 |
| 5,017,025 | 5/1991 | Otto .................................. 384/584 |
| 5,024,449 | 6/1991 | Otto .................................. 277/37 |

Primary Examiner—Lenard A. Footland
Attorney, Agent, or Firm—Edward J. Kondracki; Kerkam, Stowell, Kondracki & Clarke, P.C.

[57] ABSTRACT

A bearing assembly employs an improved seal wear ring comprising a rigid metal sleeve having an internal diameter greater than that of the shaft to provide a clearance therebetween along the full length of the wear ring. An annular spacer ring of a dense, dimensionally stable synthetic resin material such as polyvinylchloride is fitted within an annular recess on the inner surface of the metallic sleeve, with the spacer ring having an internal diameter slightly less than the external diameter of the shaft to provide an interference fit therebetween when the bearing assembly is pressed onto the shaft.

12 Claims, 2 Drawing Sheets

SHAFT JOURNAL BEARING HAVING IMPROVED SEAL WEAR RING

BACKGROUND OF THE INVENTION

1. Field of the Invention

This invention relates to sealed shaft journal bearings and more particularly to an improved bearing assembly employing a seal wear ring including a substantially cylindrical metal sleeve having an inside diameter greater than that of the shaft with which the bearing is used and an annular spacer ring formed from a low friction synthetic resin material mounted within the metal sleeve and dimensioned to provide an interference fit with the shaft surface.

2. Description of the Prior Art

Roller bearing assemblies incorporating two rows of tapered roller bearings preassembled into a self-contained, pre-lubricated package for assembly onto journals at the ends of axles or shafts are well known. Such bearing assemblies are widely used as rail car bearings assembled onto journals at the ends of the car axles and the present invention will be described with reference to such rail car bearings, it being understood that the invention is not so limited but rather that the bearings may be employed on shaft journals for various uses. Bearings of this type typically employ two rows of tapered roller bearings fitted one into each end of a common bearing cup with their respective bearing cones having an inner diameter dimensioned to provide an interference fit with the shaft journal and with a cylindrical sleeve or spacer positioned between the cones providing accurate spacing on the journal. Seals mounted within each end of the bearing cup provide sealing contact with wear rings bearing against the outer ends of the respective bearing cones at each end of the assembly.

In a typical rail car installation, the axle journal is machined with a fillet at the inboard end, and a backing ring having a surface complementary to the contour of the fillet and an abutment surface for engaging the inboard end of the inner wear ring accurately positions the bearing assembly on the journal. An end cap mounted on the end of the axle by bolts threaded into bores in the end of the axle engages the outboard wear ring and clamps the entire assembly on the end of the axle. The wear rings typically have an inner diameter dimensioned to provide an interference fit with the journal over at least a portion of their length so that the entire assembly is pressed as a unit onto the end of the journal shaft. A bearing of this type is illustrated, for example, in U.S. Pat. No. 3,494,682.

In use of bearings of the type described above, high static and dynamic loading results in flexure of the heavy axle or shaft, which flexure results in relative movement between the journal surface and the wear rings fitted thereon. This movement is greatest at the inboard wear ring and frequently results in fretting between the wear ring and the journal surfaces, and fretting or end face wear between the end of the wear ring and the abutting end of the inboard bearing cone. This fretting can, over time, produce a groove in the journal surface and an enlargement of the ring bore, and wear between the end of the wear ring and the bearing cone, which together may result in the wear ring becoming so loose as not to remain perfectly concentric with the journal surface, and this may ultimately produce seal failure.

One proposal to solve the journal fretting and end face wear problem is illustrated in U.S. Pat. No. 5,017,025 which discloses use of a seal wear ring having an internal diameter greater than the diameter of the shaft to provide a space between the wear ring and shaft throughout the length of the wear ring. The backing ring is provided with a counterbore and shoulder dimensioned to receive the end of the wear ring, with an inference fit, to align the wear ring relative to the axis of rotation. It has been found, however, that it is not always possible to obtain precise axial alignment when the bearing is installed, and further that when pressing the bearing onto the shaft, the end of the wear ring is not always precisely aligned with the counterbore in the backing ring so that the heavy pressing loads can mar the backing ring and/or shoulder which, in turn, can result in further misalignment. Even though there is no contact between the shaft and wear ring, any misalignment can lead to excessive seal wear and ultimately seal failure, and to accelerated end face wear between the seal ring and bearing cone. Even under the exacting manufacturing standards conventionally employed in the bearing art, machining tolerances can result in some eccentricity which can be magnified along the length of the wear ring which, in turn, can result in concentrated loads and localized end face wear as well as excessive seal wear.

SUMMARY OF THE INVENTION

In order to overcome the foregoing and other disadvantages of the prior art shaft journal bearing assemblies, the bearing assembly of the present invention employs an improved seal wear ring comprising a rigid metal sleeve having an internal diameter greater than that of the shaft to provide a clearance therebetween along the full length of the wear ring. An annular spacer ring of a dense, dimensionally stable synthetic resin material such as polyvinylchloride is fitted within an annular recess on the inner surface of the metallic sleeve, with the spacer ring having an internal diameter slightly less than the external diameter of the shaft to provide an interference fit therebetween when the bearing assembly is pressed onto the shaft. This spacer ring maintains concentricity between the metal sleeve and shaft during mounting of the bearing on the shaft and during operation. The low friction material of the stabilizing ring readily accommodates the minute relative movement between the ring and the shaft without resulting in fretting of the shaft or ring. Further, the stability provided by the ring also minimizes face wear between the sleeve and bearing cone as a result of runout which can be caused by improper seating of the prior art wear ring in the backing ring, or by other local stress producing irregularities. Use of the spacer ring also readily accommodates reworked or new shaft applications utilizing the same rigid metal wear ring sleeve.

BRIEF DESCRIPTION OF THE DRAWINGS

Other features and advantages of the invention will be apparent from the detailed description contained hereinbelow, taken in conjunction with the drawings, in which.

DESCRIPTION OF THE PREFERRED EMBODIMENTS

Figure 1:
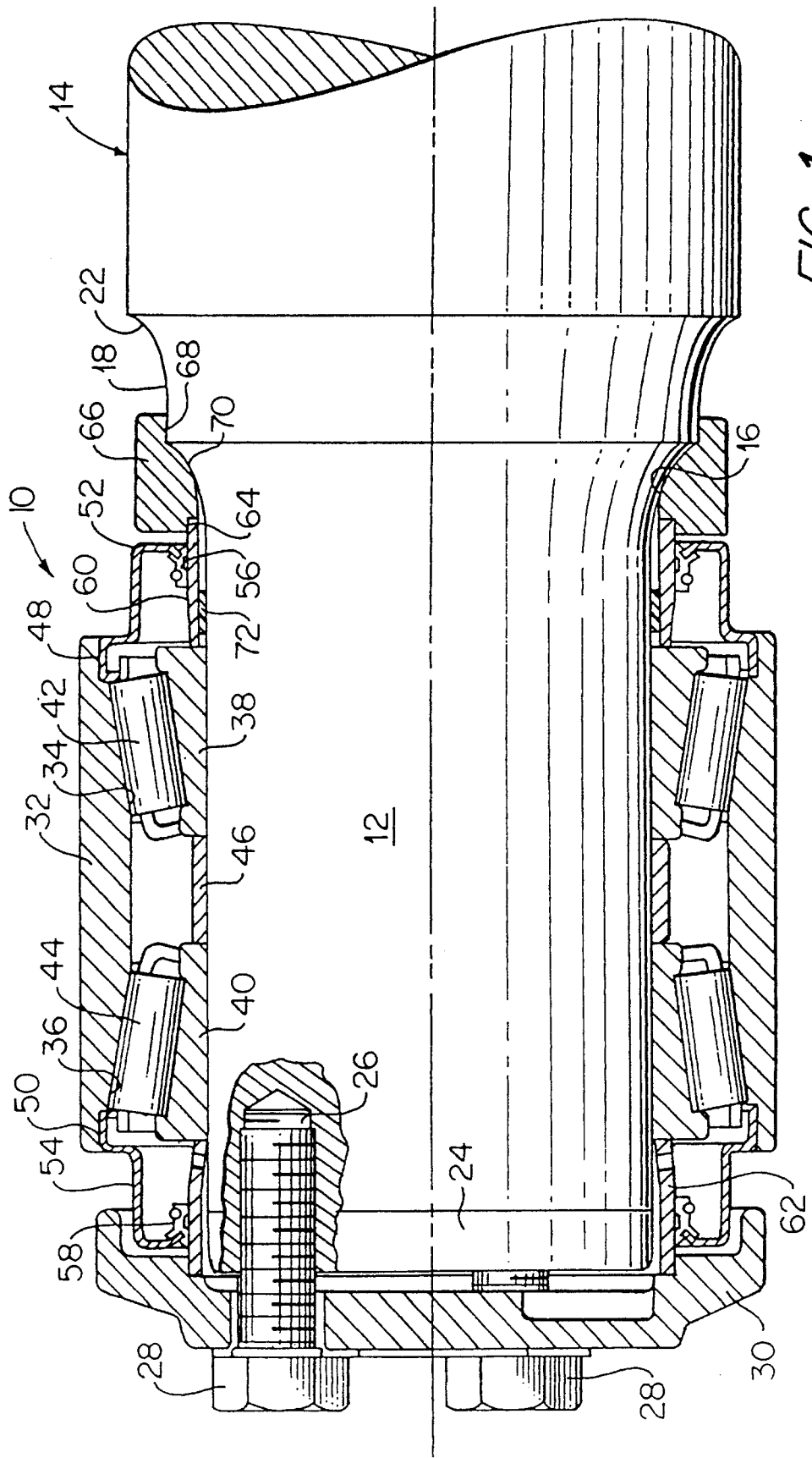
FIG. 1 is a sectional view of a shaft journal having mounted thereon a tapered roller bearing assembly constructed in accordance with the present invention.

Referring now to the drawings in detail, a bearing assembly indicated generally by the reference numeral 10 in FIG. 1 is shown mounted on a journal 12 on the free, cantilevered end of a shaft or axle 14, typically a rail car axle. Journal 12 is machined to very close tolerances and terminates at its inner end in a contoured fillet 16 leading to a cylindrical shoulder portion 18 of axle 14. Shoulder 18 is joined to the body of axle 14 through a second chamfer or fillet 22. At the free end of the axle, journal portion 14 terminates in a slightly conical or tapered guide portion 24 dimensioned to facilitate installation of the bearing assembly onto the journal. A plurality of threaded bores 26 are formed in the end of axle 14 for receiving threaded cap screws, or bolts 28 for mounting a bearing retaining cap 30 on the end of the shaft to clamp the bearing in position as described more fully hereinbelow.

The bearing assembly 10 is preassembled before being mounted and clamped on journal 12 by cap 30. The bearing assembly includes a unitary bearing cup 32 having a pair of raceways 34, 36 formed one adjacent each end thereof which cooperate with a pair of bearing cones 38, 40, respectively, to support the two rows of tapered roller bearings 42, 44, respectively, therebetween. A center spacer 46 is positioned between cones 38, 40 to maintain the cones in accurately spaced relation relative to one another.

The bearing cup 32 is provided with cylindrical counterbores 48, 50 at its opposite ends outboard of the raceways 34, 36, and a pair of seal assemblies 52, 54 are pressed one into each of the cylindrical counterbores 48, 50. The seals 52, 54 include resilient sealing elements 56, 58, respectively, which rub upon and form a seal with a pair of seal wear ring sleeves 60, 62, respectively, having their inwardly directed ends in engagement with the outwardly directed ends of bearing cones 38, 40, respectively. The other end of wear ring sleeve 60 is received in a cylindrical counterbore 64 in the axially outwardly directed end of an annular backing ring 66 which, in turn, has a counterbore 68 at its other end which is dimensioned to be received in interference relation on the cylindrical shoulder 18 of shaft 14. The counterbore 64 and the outer diameter of wear ring sleeve 60 are also dimensioned tp provide an interference fit so that the wear ring is pressed into the backing ring 66 which is accurately machined to provide a contoured inner surface 70 complementary to and engaging the contour of fillet 16 when the bearing is mounted on the shaft. The outwardly directed end of sleeve 62 bears against the retaining cap 30.

In the prior art bearings of the type illustrated, for example, in the above U.S. Pat. No. 3,494,682, the wear rings have a stepped inner surface including a larger diameter portion providing a void space between the wear ring and the journal over a substantial portion of the wear ring length and a smaller diameter portion which circumferentially contacts the journal to achieve an interference fit within prescribed tolerances. The contact area between the small diameter portion and the journal, though relatively small, is sufficient to accurately center the wear ring with respect to the axis of rotation of the bearing at the end of the wear ring opposite the backing ring to thereby provide the radial lip seal with a concentric contact area around the outer cylindrical surface of the wear ring.

As pointed out in my prior U.S. Pat. No. 5,380,102, the metal-to-metal contact between the shaft journal surface and the smaller diameter portion of the inner surface of the prior art wear ring resulted in objectionable fretting of the journal and the inner wear ring. Since rail car axles are relatively expensive, journals which have been damaged by fretting may be repaired in accordance with American Association of American Railroad Standards by machining an arcuate groove around the axle to remove the damaged area. The groove is then cold rolled or polished up to a depth of 0.010" to provide a smooth contoured surface which is no longer in contact with the conventional seal wear ring, thereby extending the useful life of the axles. In extreme cases involving maximum axle wear and minimum interference fit, the prior art seal wear rings could be out of contact with the journal surface along its full length after repair of the journal. In such circumstances, the interference fit with the journal surface could no longer be relied upon to compensate for out-of-roundness of the seal wear ring, and the countersink shoulder in the backing ring was relied upon entirely for centering the wear ring with respect to the axis of rotation. This increased out-of-roundness and loss of concentricity could adversely affect seal performance and consequently, bearing life.

In accordance with the present invention, both fretting and out-of-roundness at the inner wear ring 60 is minimized by employing an annular spacer ring 72 of dimensionally stable, low friction synthetic resin material such as polyvinylchloride interposed between the inner surface of the inner seal wear ring 60 and the outer cylindrical surface of the shaft journal 12. Seal wear ring 60 has its inner surface spaced from the journal surface along its full length and is provided with a shallow annular groove 74 around its inner periphery at a location spaced from the end thereof contacting the backing ring. The outer circumference of the spacer ring 72 has a diameter which is slightly greater than the diameter of the groove 70 so that, when the spacer ring is installed within the groove, the spacer ring is under a slight compressive load. The depth of the groove 74 is such that the spacer ring may be inserted into the seal wear ring by a pressing operation, and telescoped along the inner surface of the seal wear ring until it snaps into the groove 74.

The inner diameter of spacer ring 72 is slightly less than the outer diameter of journal 12 so that, when the spacer ring and seal wear ring are assembled, the spacer ring provides an interference fit on the journal. Thus, once installed, the spacer ring 72 remains under a compressive load between the journal surface 12 and the inwardly directed cylindrical surface of the groove 74.

In a preferred embodiment, seal wear ring 60 may be provided with an inwardly directed narrow flange portion 76 extending from the groove 74 to the end of the wear ring which contacts the bearing cone 38. Flange 76 provides a positive stop for the spacer ring 72 during installation. Also, seal wear ring 60 is preferably provided with a slightly flared or contoured surface 78 at the juncture of its inner surface and the end surface which contacts the counterbore 64, with surface 78 acting as a guide and facilitate insertion of the spacer ring.

Figure 2:
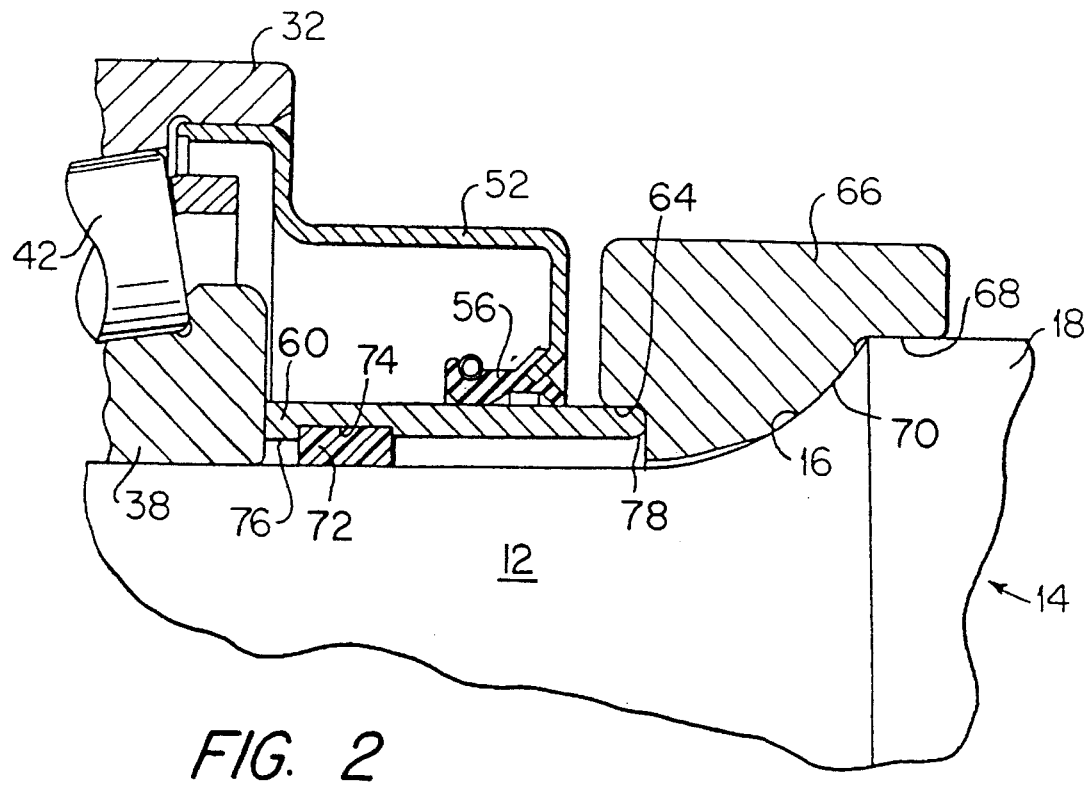
FIG. 2 is an enlarged, fragmentary sectional view of a portion of the assembly shown in FIG. 1 in the region of the inboard seal wear ring and backing ring.
Figure 3:
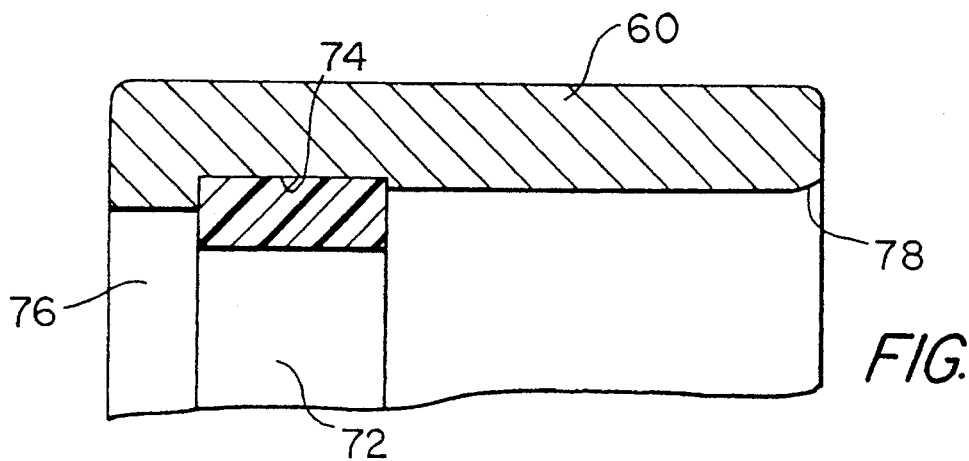
FIG. 3 is a further enlarged partial sectional view of one embodiment of the seal wear ring of the present invention.
Figure 4:
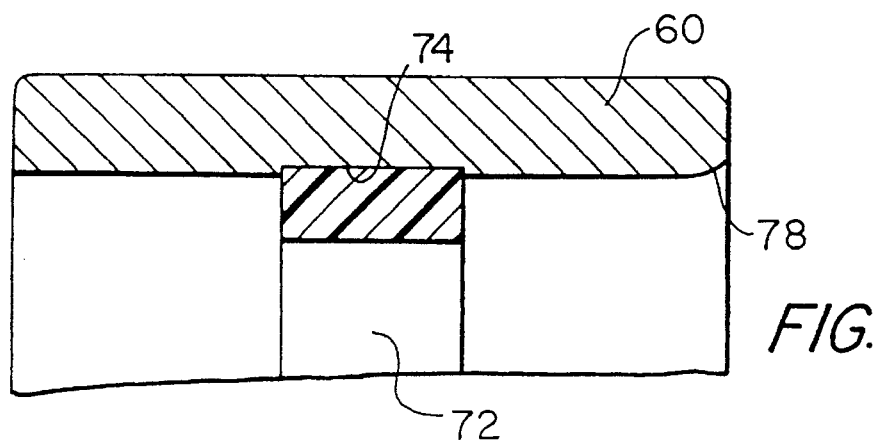
FIG. 4 is a view similar to FIG. 3 and illustrating a further embodiment of the seal ring.

Spacer ring 72 may be located along seal wear ring 60 at a position substantially centered beneath the contact area of the primary sealing lip of resilient seal element 56, as shown in FIG. 4, but preferably is located closer to or adjacent the end of seal wear ring 60 which contacts the bearing cone 38 as illustrated in FIGS. 1 and 2. Also, the axial length of the spacer ring 72 is not critical provided it is sufficiently long to withstand sufficient compressive stresses to overcome any out-of-roundness of the seal wear ring resulting from manufacturing tolerances and to center the seal wear ring relative to the axis of rotation of the bearing. When spacer ring 72 is formed from a dense polyvinylchloride material, the axial length of the ring preferably is within the range of about 0.2 to 0.3 times the length of the seal wear ring, and preferably is no greater than about ½ the overall length of the seal wear ring. It has been found that such spacer rings, used in conjunction with a seal wear ring on a conventional rail car bearing, provides the desired concentricity of the seal wear ring outer surface with the axis of rotation of the bearing in a manner comparable to the prior art metal seal wear rings having contact with the journal surface over a portion of their lengths as illustrated in the above-mentioned U.S. Pat. No. 3,494,682. At the same time, the relatively low friction material of the spacer ring substantially eliminates fretting of the journal surface and greatly extends axle and journal life.

It is believed apparent that, while polyvinylchloride material such as employed in the production of commercial pipes provides the low friction, dimensionally stable, high strength characteristics required for the spacer ring, other synthetic resin materials might also be employed. Also, while preferred embodiments of the invention have been disclosed and described, it should be apparent that the invention is not so limited and it is intended to include all embodiments thereof which would be apparent to one skilled in the art and which come within the spirit and scope of the invention.

What is claimed is:

1. For use in combination with a shaft having a shoulder spaced from a free end, a journal of smaller diameter than the shaft between the shoulder and free end, and a contoured fillet leading from the journal to the shoulder, an improved bearing assembly adapted to be fitted onto the journal and into another structure to permit relative rotation between the shaft and the other structure, the bearing assembly comprising, a roller bearing including an inner race fitted around the journal and having an outwardly directed raceway thereon, an outer race having an inwardly directed raceway thereon, and roller elements located between and contacting the inner and outer raceways, a backing ring having a contoured surface complementary to and engaging said contoured surface of said fillet, said contoured surfaces cooperating to fix said backing ring against radial and axial movement on the shaft when the bearing is installed thereon, a counterbore formed in said backing ring, an elongated annular seal wear ring interposed between and engaging said inner race and said backing ring, said seal wear ring having a first end bearing against said inner race and a second end received in interference relation within said counterbore to radially and axially fix said second end on the journal, said seal wear ring having an inner surface radially spaced along its full length from the surface of said shaft journal, and an annular spacer ring of dimensionally stable, synthetic resin material interposed between said inner surface of said seal wear ring and said journal surface at a location spaced from said first end of said metal sleeve, whereby said seal wear ring is accurately centered with respect to the axis of rotation, said annular spacer ring being dimensioned to provide an interference fit both with said shaft journal.

2. The invention defined in claim 1 further comprising an annular groove formed in the inner surface of said seal wear ring, said spacer ring being located within said annular groove and fixed thereby against axial movement with respect to said seal wear ring.

3. The invention defined in claim 2 wherein said spacer ring is formed from a polyvinylchloride material.

4. The invention defined in claim 3 wherein said spacer ring has an axial dimension no greater than about ½ the length of said seal wear ring.

5. The invention defined in claim 4 wherein said backing ring has a second bore formed therein in position to receive the shoulder on the shaft to rigidly retain said backing ring against radial movement.

6. The invention defined in claim 3 wherein the axial length of said spacer ring is within the range of about 0.2 to about 0.3 times the length of said seal wear ring.

7. For use in combination with a shaft having a shoulder spaced from a free end and a journal of smaller diameter extending from the shoulder to the free end, an improved bearing assembly adapted to be fitted on the journal and retained thereon by an end cap mounted on the shaft free end to permit relative rotation between the shaft and an element supported by the bearing, said bearing assembly comprising:

an inboard bearing cone and an outboard bearing cone mounted on said journal, each said bearing cone defining an outwardly directed raceway and each having an inner diameter providing an interference fit on the journal, a bearing cup defining a pair of inwardly directed tapered outer raceways located one in radially outwardly spaced relation to each of said inner raceways, and rolling elements located between the inner and outer raceways, a backing ring adapted to be mounted on the journal and engage the shoulder in a manner to radially and axially fix the backing ring on the shaft, said backing ring having an outwardly directed counterbore formed therein defining an axial shoulder, a first seal wear ring having a first end portion received in interference relation within said counterbore and abutting said axial shoulder and a second end portion abutting said inboard bearing cup, said first seal wear ring having its inner surface radially spaced from said journal along the full length of the seal wear ring, and a second seal wear ring mounted in contact with said outboard bearing cone and said end cap, a pair of annular seal elements interposed one between said bearing cup and each said seal wear ring forming a lubricant barrier at each end of the bearing, and an annular ring of dimensionally stable, low friction synthetic resin material interposed between said inner surface of said first seal wear ring and the journal surface at a location spaced from said first end portion, said spacer ring having an outer cylindrical surface in contact with and fixed against axial movement relative to the inner surface of said seal wear ring and its inner surface dimensioned to be received in interference relation on said journal.

8. The invention defined in claim 7 further comprising an annular groove formed in the inner surface of said seal wear ring, said spacer ring being located within said annular groove and fixed thereby against axial movement with respect to said seal wear ring.

9. The invention defined in claim 8 wherein said spacer ring is formed from a polyvinylchloride material.

10. The invention defined in claim 8 wherein said shoulder comprises a contoured fillet and wherein said backing ring comprises a complementary curved surface contacting said fillet and cooperating therewith to radially and axially fix said backing ring relative to said journal.

11. The invention defined in claim 10 wherein said spacer ring is an annular ring of polyvinylchloride having an axial dimension no greater than about one half the length of said seal wear ring.

12. The invention defined in claim 11 wherein the axial length of said spacer ring is within the range of about 0.2 to about 0.3 times the length of said seal wear ring.

* * * * *

UNITED STATES PATENT AND TRADEMARK OFFICE
CERTIFICATE OF CORRECTION

PATENT NO. : 5,549,395
DATED : Aug. 27, 1996
INVENTOR(S) : Danny R. Sink

It is certified that error appears in the above-indentified patent and that said Letters Patent is hereby corrected as shown below:

Claim 1, column 5, line 53, delete "both".

Signed and Sealed this

Seventh Day of January, 1997

*Attest:*

BRUCE LEHMAN

*Attesting Officer*      *Commissioner of Patents and Trademarks*